S. G. BROWN.
ELECTRIC CONDUCTOR.
APPLICATION FILED DEC. 11, 1903.
912,801.
Patented Feb. 16, 1909.
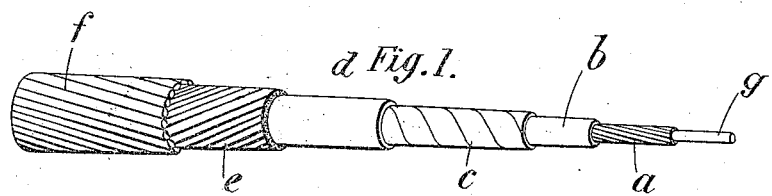
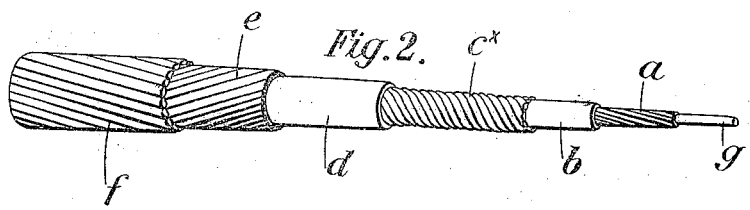
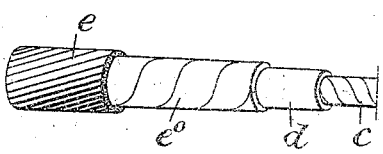
Witnesses:
Inventor
Sidney G. Brown
By James L. Norris
Atty.

UNITED STATES PATENT OFFICE.

SIDNEY GEORGE BROWN, OF LONDON, ENGLAND.

ELECTRIC CONDUCTOR.

No. 912,807.

Specification of Letters Patent.

Patented Feb. 16, 1909.

Application filed December 11, 1903. Serial No. 184,764.

*To all whom it may concern:*

Be it known that I, SIDNEY GEORGE BROWN, a subject of the King of Great Britain, residing at 4 Great Winchester street, in the county of London, England, electrical engineer, have invented certain new and useful Improvements Relating to Electric Conductors, of which the following is a specification.

This invention relates to the manufacture of electric conductors or cables for employment in connection with submarine or subterranean telegraph or telephone systems.

Electric conductors as heretofore constructed have been more or less inefficient in that they possess a preponderance of resistance and capacity; the speed of signaling being thereby materially affected.

Now the object of the present invention is to render the conductor self-inductive to counteract the effect of capacity without seriously diminishing its resistance, and thereby to increase the speed of working.

In manufacturing, for example, a conductor or cable, for submarine use, the central copper conductor may be suitably insulated and good magnetic material, such as iron strip or iron wire, may be wound over the insulation. The magnetic material may then be inclosed in a covering of insulating material and finally taped and armored as is usual with submarine cables.

In order that the said invention may be clearly understood and readily carried into effect, I will now proceed to describe the same more fully with reference to the accompanying drawings, in which:—

Figure 1 is a fragmentary view in side elevation illustrating a conductor constructed according to the present invention and adapted for submarine use; the magnetic material being shown in the form of the strip. Fig. 2 is a view similar to Fig. 1 in which the magnetic material is shown in the form of wire. Fig. 3 is a view in side elevation having for its object the illustration of the ordinary taping or sheathing which may be interposed between the insulation about the iron and the jute covering.

Referring to Fig. 1, $a$ is the central copper conductor and $b$ is the surrounding insulating material which may be a suitably insulating tape or gutta-percha. $c$ represents a winding of iron strip which is served with an insulating covering $d$, such as gutta-percha; care being taken that the insulation of this iron strip is efficiently carried out. Other insulating materials may be employed as found convenient. For instance, paper, cotton, indiarubber or other insulator may be substituted for the gutta-percha hereinbefore mentioned. When paper is used it is preferably impregnated with tar or other insulator and applied as a winding of suitable thickness.

For the purpose of electrically insulating the copper from the iron, the thickness of the insulator around the central copper conductor may be so reduced as to be constituted simply of a film of the oxids on the metals, i. e. the copper and iron themselves, or to the varnish or other thin insulating medium or coating that may be applied to the metals. In the example illustrated, which represents a conductor applicable for submarine use, a covering $e$, which may be jute, is applied to the insulation $d$ the conductor being finally inclosed in the iron or steel wire armoring $f$. Between the insulation $d$ and the jute covering $e$ there may be interposed the brass taping or sheathing $e^0$ ordinarily employed, and indicated in Fig. 3 of the drawings.

$g$ is the usual central wire of the conductor. The iron strip may be wound in any suitable manner and with a view to insuring a suitable protection the turns thereof may be drawn through insulating material such as tar or Chatterton compound, which may be heated as required; ingress of air being effectually prevented. The said iron strip $c$ may be replaced by round or rectangular iron wire $c^x$ as shown in Fig. 2; the construction of the conductor being otherwise precisely similar to that described with reference to Fig. 1. The invention is equally applicable to multi-conductor cables.

The structure may be twisted if desired, for mechanical reasons and also with a view to preventing mutual induction with neighboring conductors.

In duplexing the aforesaid cable, it is simply necessary to construct the artificial line so as to be similar in every respect to the cable, or, in other words, so as to constitute an artificial representation of the cable itself. Therefore, in duplexing the cable the artificial line should itself possess self-induction similarly to the cable and this may be effective, say, by winding the conductor of such artificial line about a core of iron or other magnetic material, or by winding magnetic material about the conductor.

For use as an aerial line, the conductor may consist of three elements, viz. the conductor, the insulator and the inclosing iron strip or winding; the outer insulator being dispensed with.

The iron strip or winding may form a conductor for testing purposes. Preferably such iron strip or winding should be in the form of short lengths so as the more effectually to destroy its conduction. When employing iron wire as the magnetic material, however, this may be conveniently brought about by suitably insulating the same by the oxid of the iron or by cotton or the like; the resistance of the wire causing it to act in a similar manner, destroying its conduction for all practical purposes. By placing the iron between the inner conductor (copper) and the outer conductor, which may be, for instance, the outer sheathing, the water or the earth, the cable is rendered self-inductive but such arrangement does not affect the resistance which latter remains unaltered. The speed of signaling is, however, increased.

In the examples illustrated, the cable is provided with insulating material between the inner copper conductor and the iron magnetic circuit surrounding it. This method of construction has been adopted because it is considered important that all the signaling currents should flow in the conductor (copper) and exert their full magnetizing effect on the iron. This would not be the case if the iron made metallic contact with the copper as part of the signaling current would flow in the iron.

Referring particularly to Fig. 2, if the iron wire be well oxidized, it might, without serious loss in the magnetizing effect on the iron, be wound directly on the copper, the insulation $b$ being omitted, provided the iron wire be arranged discontinuously as much as possible so as to ruin it for serving as a conductor. Furthermore, it is advantageous to keep the iron as near to the conductor as possible so as to reduce the length of the iron forming the magnetic circuit. The iron for the magnetic circuit should be of as high a permeability as possible, soft pure iron or an alloy of iron with small percentages of silicon or aluminium being suitable.

In a conductor such as hereinbefore described the discontinuity of the iron insures the prevention of electrostatic charges running along the iron. Interference between neighboring conductors is also minimized.

What I claim and desire to secure by Letters Patent of the United States is:—

1. In submarine or subterranean telegraph or telephone systems, a conductor, comprising in combination an inner conductor, an outer conductor, a closed iron magnetic circuit enveloping the inner conductor and dielectric between the inner conductor and the magnetic envelop and between the latter and the outer conductor.

2. In submarine or subterranean telegraph or telephone systems, a conductor, comprising in combination an inner conductor, an outer conductor, a closed magnetic circuit of iron of high permeability laid up so as to continuously envelop the inner conductor, and dielectric between the inner conductor and the closed magnetic circuit and between the latter and the outer conductor.

3. In submarine or subterranean telegraph or telephone systems, a conductor comprising in combination an inner conductor, an outer conductor, closed spiral winding of iron forming a closed magnetic circuit about the inner conductor, and dielectric between the inner conductor and the aforesaid closed spiral, and between the latter and the outer conductor.

4. In submarine or subterranean telegraph or telephone systems, a conductor comprising in combination an inner conductor, an outer conductor, and closed spiral winding of iron of high permeability forming a closed magnetic circuit about the inner conductor and dielectric between the inner conductor and the aforesaid closed spiral and between the latter and the outer conductor.

In testimony whereof I have hereunto set my hand in presence of two subscribing witnesses this 27th day of November, 1903.

SIDNEY GEORGE BROWN.

Witnesses:
  TILLY WARDLE,
  JOSEPH LUKE.